(12) United States Patent
Carsley et al.

(10) Patent No.: US 8,640,320 B2
(45) Date of Patent: Feb. 4, 2014

(54) METHOD OF JOINING BY ROLLER HEMMING AND SOLID STATE WELDING AND SYSTEM FOR SAME

(75) Inventors: John E. Carsley, Oakland, MI (US); Blair E. Carlson, Ann Arbor, MI (US); James G. Schroth, Troy, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 13/024,423

(22) Filed: Feb. 10, 2011

(65) Prior Publication Data

US 2012/0204412 A1 Aug. 16, 2012

(51) Int. Cl.
*B21D 39/00* (2006.01)

(52) U.S. Cl.
USPC .............................. 29/509; 228/155; 228/158

(58) Field of Classification Search
USPC .......... 29/509; 228/112.1, 136, 137, 155, 158
See application file for complete search history.

(56) References Cited

U.S. PATENT DOCUMENTS

| | | | | |
|---|---|---|---|---|
| 4,975,133 A | * | 12/1990 | Gochermann | 156/73.1 |
| 5,228,190 A | * | 7/1993 | Sawa | 29/715 |
| 5,487,803 A | * | 1/1996 | Sweeney et al. | 156/91 |
| 5,507,165 A | * | 4/1996 | Hartley | 72/311 |
| 6,161,410 A | * | 12/2000 | Shook et al. | 72/220 |
| 6,257,043 B1 | * | 7/2001 | Wiens | 72/412 |
| 6,642,473 B2 | * | 11/2003 | Stiers et al. | 219/121.63 |
| 6,694,793 B1 | * | 2/2004 | Persson | 72/220 |
| 7,124,611 B2 | * | 10/2006 | Baulier et al. | 72/220 |
| 7,254,973 B2 | * | 8/2007 | Campian | 72/220 |
| 7,870,774 B2 | * | 1/2011 | Hasegawa et al. | 72/220 |
| 2007/0257087 A1 | * | 11/2007 | Klinstein et al. | 228/101 |
| 2008/0000071 A1 | * | 1/2008 | Chen et al. | 29/509 |
| 2009/0083962 A1 | * | 4/2009 | Sandman et al. | 29/509 |
| 2009/0229335 A1 | * | 9/2009 | Carsley et al. | 72/306 |
| 2010/0313621 A1 | * | 12/2010 | Kumagai et al. | 72/220 |

OTHER PUBLICATIONS

J.E. Carsley, "Microstructural Evolution During Bending: Conventional vs. Roller Hemming of Aluminum Sheet," Trends in Materials and Manufacturing Technologies for Transportation industries, eds. T.R. Bleier, J.E. Carsley, H.L. Fraser, J.W. Sears, J.E. Smugeresky, TMS (2005) 169-174. The Minerals, Metals and Materials Society, 184 Thom Hill Road, Warrendale Pennsylvania.

* cited by examiner

Primary Examiner — David Bryant
Assistant Examiner — Ruth G Hidalgo-Hernandez
(74) Attorney, Agent, or Firm — Quinn Law Group, PLLC

(57) ABSTRACT

A method of joining a first and a second work piece, such as automotive closure panels, includes supporting the work pieces on a fixture, and then joining the work pieces to one another by a first solid state weld with a vibrating roller head of a tool assembly, such as a robotically-controlled ultrasonic seam welder. Next, a flange of the second work piece is hemmed about an outer periphery of the first work piece using the same or a different roller head with the work pieces supported by the fixture. The hemmed flange is then joined to the first work piece by a second solid state weld with the vibrating roller head of the robotically-controlled ultrasonic seam welder. A system for joining a first and a second work piece is also provided.

12 Claims, 2 Drawing Sheets

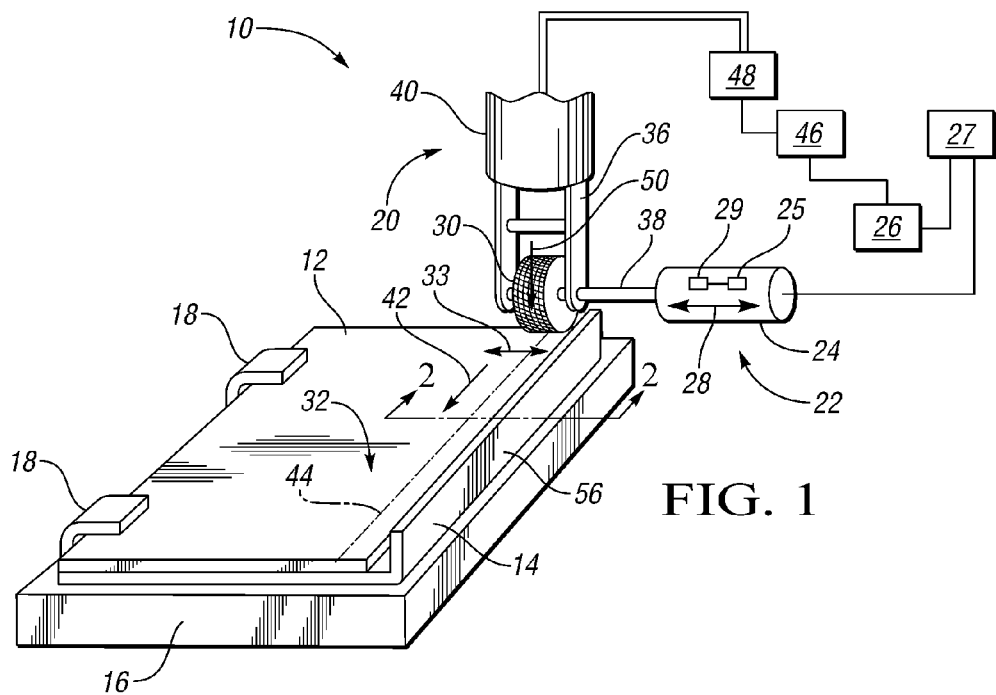
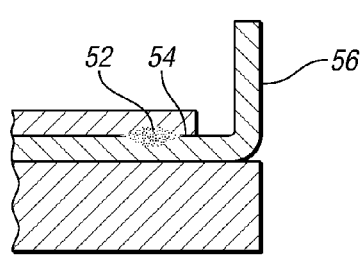
FIG. 2
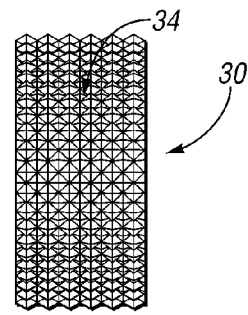
FIG. 3
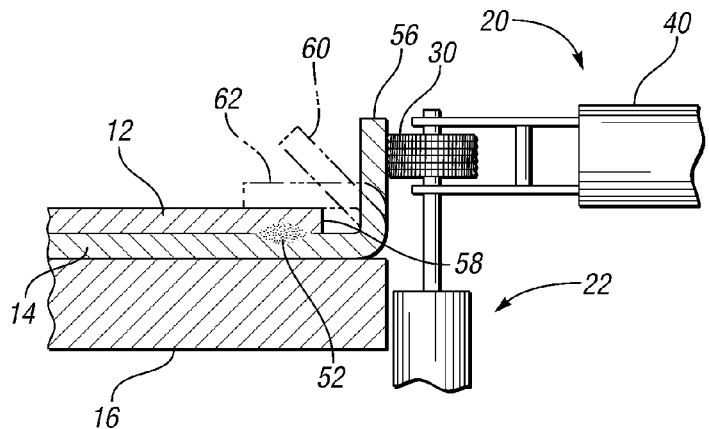
FIG. 4

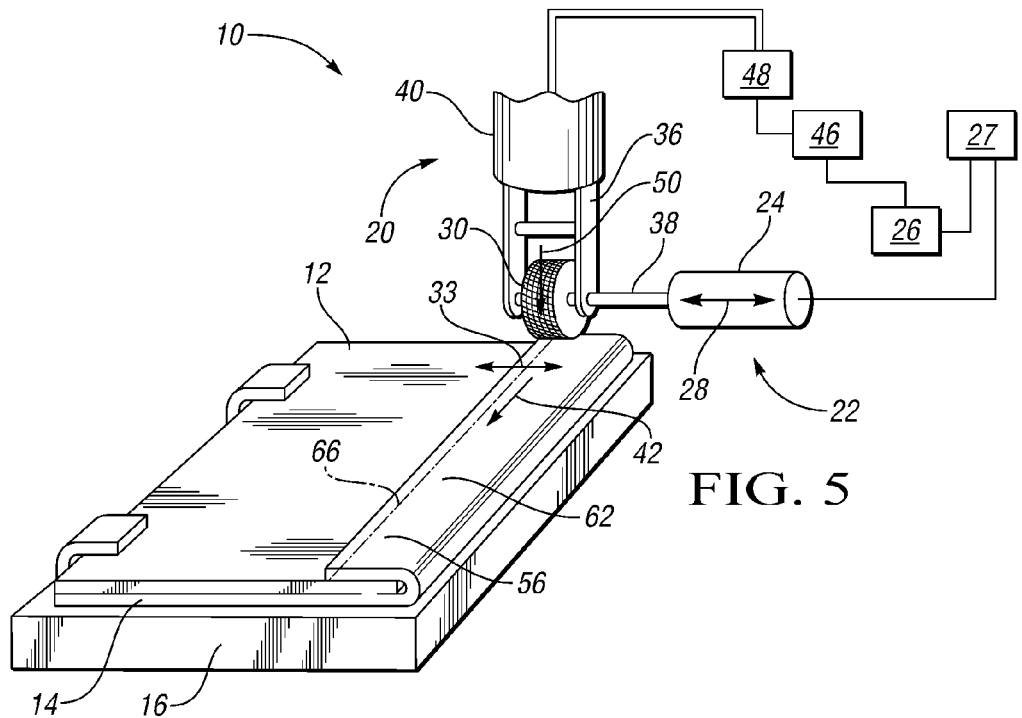
FIG. 5
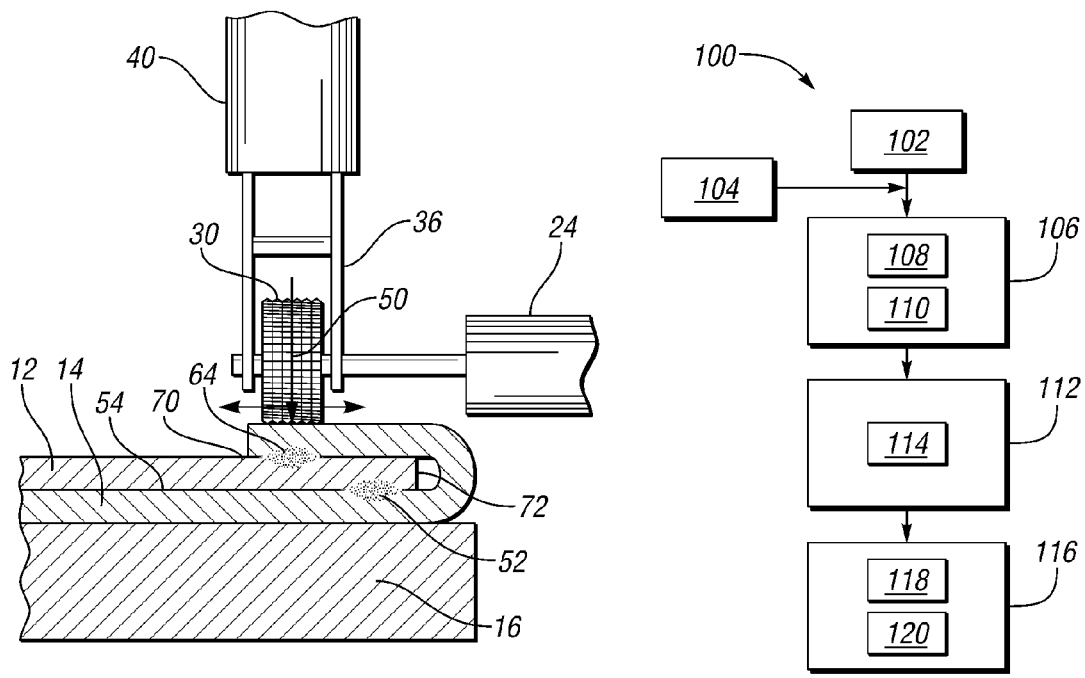
FIG. 6
FIG. 7

METHOD OF JOINING BY ROLLER HEMMING AND SOLID STATE WELDING AND SYSTEM FOR SAME

TECHNICAL FIELD

The invention relates to a method of joining two work pieces, such as two automotive closure panels, by roller hemming and solid state welding, and a system for carrying out the method.

BACKGROUND

Roller hemming is a production process for assembling closure panels made from either steel or an aluminum alloy sheet metal. Roller hemming uses a roller head typically as an end component on a robot that travels along a flange of one panel, gradually bending the flange over the edge of the other panel to form a roll hem. The assembly sequence typically includes application of a hem flange adhesive to the inside periphery of the outer panel, which is nested in a hemming anvil. An inner panel is placed in contact with the outer panel to marry the two panels. The outer panel flange is bent to create a roll hem over the peripheral edge of the inner panel. Depending on the type of adhesive used, it may be necessary to then move the assembly to an induction curing station to provide in-process dimensional stability of the closure by curing the adhesive. The assembly is then transferred to other work cells to undergo other processes in the plant. Finally, an after-hem sealer is applied (e.g., after the e-coat process). Seam welds are not used on hemmed closure panels in automotive applications, as the appearance of the surface of the panel at the seam weld would not be suitable for its purpose as a closure panel in an automotive body. Thus, the adhesive joins the panels, and the sealer is used to prevent water migration past the roll hem to the adhesive.

Ultrasonic welding is an industrial joining method that locally applies high frequency vibrations to work pieces held together under pressure to create a solid state weld. Such equipment has been used in production primarily for welding plastics and/or dissimilar metals. One application of ultrasonic welding can create a seam at the interface between two sheet metals in a lap joint configuration. Ultrasonic seam welding uses a rotating transducer attached to a roller tool that engages a top sheet, transfers high frequency vibration to the interface of a top and bottom sheet, respectively, resulting in a solid state weld joining the two sheets.

SUMMARY

While roller hemming provides joints on closure panels that are sufficient for their purpose, a large number of assembly steps and multiple work cells are required for completing the joint, increasing both assembly time and expense. For example, adhesive is required between the two panels prior to roll hemming in order to increase the bond strength of the hemmed flange and to secure the relative positions of the panels. A sealer is applied over the hem, to prevent water from entering and corroding the joint.

A method of joining a first work piece to a second work piece includes supporting the work pieces on a fixture, and then joining the work pieces to one another by a first solid state seam weld with a vibrating roller head of a tool assembly, such as a robotically-controlled ultrasonic seam welder. Next, a flange of the second work piece is hemmed about an outer periphery of the first work piece using the same or a different roller head with the work pieces supported by the fixture. The hemmed flange is then joined to the inner panel by a second solid state seam weld with the vibrating roller head of the robotically-controlled ultrasonic seam welder.

A system for joining a first and a second work piece includes a fixture configured to support the work pieces with the first work piece stacked on top of the second work piece. A robotic mechanism is configured to apply a roller head of a tool assembly to the work pieces and move the roller head along a predefined path on the first work piece while providing a normal force to the work pieces through the roller head. A transducer of the tool assembly is operatively connected to the roller head. A controller is configured to selectively cause the transducer to vibrate the roller head generally lateral to the direction of movement of the roller head along the predefined path at a frequency and power level sufficient to join the work pieces by a solid state weld when the robotic mechanism applies the normal force to the work pieces simultaneously with the movement and the vibration. The tool assembly is configured to apply force to a flange of the second work piece to create a roll hem around at least a portion of a periphery of the first work piece. The controller is also configured to move the roller head along the hemmed flange while simultaneously causing the transducer to vibrate the roller head generally lateral to the direction of movement of the roller head at a frequency and power level sufficient to join the flange to the first work piece by another solid state weld when the robotic mechanism applies the normal force to the flange simultaneously with the movement and the vibration.

By combining roller hemming and ultrasonic seam welding in a single work cell, work pieces joined at a roll hem are provided with a minimal number of processing steps. Because the process is carried out in a single work cell (i.e., on a single fixture), transfer of the work pieces during intermediate processing steps is not required. Furthermore, with the seam welds, the panels will not shift during in plant processing. No adhesive or sealer is necessary, as the solid state welds secure the panels and prevent entry of water past the welds.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective partially fragmentary view of a system for joining two work pieces;

FIG. 2 is a schematic fragmentary cross-sectional illustration taken at lines 2-2 in FIG. 1, after joining the work pieces via a first solid state seam weld with the roller head of the tool assembly of FIG. 1;

FIG. 3 is a schematic side view illustration of the roller head of FIG. 1 showing a knurled surface that contacts the work pieces;

FIG. 4 is a schematic side-view illustration of the roller head of FIG. 1 controlled to create a roll hem with a flange of one of the work pieces;

FIG. 5 is a schematic perspective partially fragmentary view of the system of FIGS. 1, 3 and 4 with the roller head and tool assembly controlled to create a second solid state seam weld;

FIG. 6 is a schematic side-view illustration of the roller head of FIGS. 1, 3, 4 and 5 controlled to create the second solid state seam weld to join the work pieces; and FIG. 7 is a flow diagram of a method of joining the work pieces.

DETAILED DESCRIPTION

Referring to the drawings, wherein like reference numbers refer to like components throughout the several views, FIG. 1 shows a system 10 for joining two work pieces. The work pieces are referred to as a first work piece, inner panel 12, and a second work piece, outer panel 14. The panels 12, 14 may be steel, an aluminum alloy, a magnesium alloy, a titanium alloy, or combinations of these. For example, the inner panel 12 may be a magnesium alloy while the outer panel 14 may be an aluminum alloy. The panels 12, 14 are stacked with the inner panel 12 on top of the outer panel 14. The panels 12, 14 are secured to a fixture 16, also referred to as an anvil. Robotically controlled clamps 18 or other securing mechanisms are used to hold the panels 12, 14 in a fixed position relative to one another on the fixture 16. The clamps 18 may be moved and relocated to secure the panels to the fixture 16 in different positions during different phases of the joining process, if desired. Once secured to the fixture 16, a robotic assembly 20 moves a tool assembly 22 relative to the panels 12, 14 to join the panels 12, 14, as described below. In some embodiments, the fixture 16, with the panels 12 secured thereon, may be movable relative to the robotic assembly 20. The entire joining process (described herein as a method of joining 100 in the flow diagram of FIG. 7) is carried out with the panels 12, 14 on the same fixture 16, saving floor space and minimizing processing steps.

The tool assembly 22 includes a transducer 24 connected to a first controller 26. The controller 26 controls the power supply 27 between on and off states. When the power supply 27 is on, the controller 26 selectively causes the transducer 24 to vibrate back and forth in the direction of double arrow 28. The transducer 24 includes a converter 25 that converts the electrical signal from the power supply 27 to a mechanical vibration, and is configured so that a roller head 30 and components that move with the roller head 30 vibrate at a desired frequency, such as 20-40 kilohertz (kHz). The transducer 24 may also include an optional booster 29 that amplifies the vibration frequency provided by the converter 25. To provide the required vibrational energy to the site to be welded, the roller head 30 acts as a sonotrode. The geometry of the roller head 30 may be tailored to resonate at a specific desired frequency and amplitude for a given welding application.

The transducer 24 is rigidly connected to the roller head 30 that the robotic assembly 20 selectively places in contact with the inner panel 12. When the transducer 24 vibrates, the roller head 30 moves back and forth with the inner panel 12 while contacting the surface 32 of the inner panel 12, as indicated by double-sided arrow 33. The roller head 30 may also be referred to as a sonotrode, and the tool assembly 22 may be referred to as an ultrasonic seam welder as it can be controlled to provide a solid state seam weld of the panels 12, 14 to one another. Referring to FIG. 3, the surface 34 of the roller head 30 that contacts the inner panel 12 may be knurled or otherwise treated or formed to have a coefficient of friction sufficient to cause the surface 34 to grip the inner panel surface 32, causing the inner panel 12 to move with the vibrating roller head 30, creating the first solid state weld 52, as indicated in FIG. 2, at the interface 54 of the inner panel 12 and the outer panel 14. In FIG. 3, the surface 34 is knurled.

Referring again to FIG. 1, the tool assembly 22 is connected to the robotic assembly 20. A support system represented schematically as the fork arm 36 of the robotic assembly 20 is connected to the roller head 30 at a center axis of the roller head 30, and is represented by the center rod 38 about which the roller head 30 rotates. Other embodiments of a robotic assembly may be used to apply the roller head 30 to the panels 12, 14. The robotic assembly 20 includes an arm 40 movable to move the fork 36 and the roller head 30 relative to the panels 12, 14, such as in the direction of arrow 42 along a predefined path 44. A second controller 46 controls a hydraulic pressure source and valve body 48 that directs hydraulic pressure to move the arm 40 and to apply the arm 40 and fork 36 to create a desired normal force 50 through the roller head 30. In some embodiments, hydraulic pressure is not used, and electronically-controlled motion of the arm 40 creates the necessary normal force 50 for welding, as well as the necessary forces for hemming. In some embodiments, the controller 46 may be connected to the fixture 16 to move the fixture 16, with the panels 12, 14 secured thereon, relative to the arm 40. The controller 46 and the pressure source and valve body 48 may also be connected to the clamps 18 for locking and releasing the clamps 18 to allow repositioning of the panels 12, 14. A separate power supply (not shown) is used to provide electric power to the controller 46. Alternately, the controllers 26, 48 could be combined as a single controller, and a single power supply could selectively direct power to the integrated controller, which would direct power to both the transducer 24 and the pressure source and valve body 48, and only to the pressure source and valve body 48 when the vibrating function of the transducer 24 is not needed. The robotic assembly 20 and roller head 30 are constructed similarly to a hem roller, except that the tool assembly 22 is integrated with the robotic assembly 20 such that both the solid state seam weld of an ultrasonic weld assembly and the hemming function of a hem roller are provided with the same system 10, and, optionally, using the same roller head 30.

To join the panels 12, 14, a first solid state weld 52, shown in FIG. 2, is created at an interface 54 of the panels 12, 14 by controlling the robotic assembly 20 to move the roller head 30 along the predefined path 44 of FIG. 1 while simultaneously applying the normal force 50 and controlling the transducer 24 to vibrate the roller head 30 as indicated by double-sided arrow 33. The first solid state weld 52 is between the panels 12, 14 and extends along the length of the path 44, on the opposite side of the inner panel 12 than the side that the roller 30 moves along. Alternately, the weld 52 may be a series of discrete segments rather than a continuous seam.

After the first solid state weld 52 is completed, the power supply 27 is turned off. Referring to FIG. 4, the tool assembly 22 is then manipulated by the robotic assembly 20 so that the roller head 30 bends a flange 56 of the outer panel 14 around an outer periphery 58 of the inner panel 12. In this embodiment, the flange 56 has been created in a previous die operation at approximately a 90 degree angle to the remainder of the outer panel 14. The robotic assembly 20 may move the roller head 30 along the flange 56 several times to bend the flange 56 in stages as indicated by the flange 56 in an intermediate position 60 and then in a final position 62, creating a roll hem. When the flange 56 is in the final position 62, it may be referred to as a roll hem. While bending the flange 56 to create the roll hem, the robotic assembly 20 moves the roller head 30 to function as a roller hem head. The transducer 24 of the tool assembly 22 is not powered during the roller hemming portion of the process, so that the roller head 30 only rolls and does not vibrate lateral to the direction of rolling movement.

Referring to FIG. 5, once the hem is created by bending the flange 56 to the final position 62, a second solid state weld 64, shown in FIG. 6, is created by simultaneously moving the robotic assembly 20 so that the roller head 30 moves along a predefined path 66, shown in FIG. 5, while applying the normal force 50 and vibrating the roller head 30 lateral to the path 66 via the transducer 24. The second solid state weld 64 may be offset from the first solid state weld 52, as shown in the embodiment of FIG. 6, to ensure that the surface on which the second solid state weld 64 is made has not been affected by the first solid state weld 52. The normal force 50 may be the same or a different magnitude force as was used in creating the first solid state weld 52. Once the second solid state weld 64 is complete, joining of the panels 12, 14 at the roll hem (i.e., at the bent flange 62) is finished. No sealer is required at the area 70 of FIG. 6 near the edge of the flange 56 and the inner panel 12. The second solid state weld 64 is sufficiently consistent across the entire length of the flange 56 such that water is unable to enter the area 72 or contact the interface 54.

Referring to FIG. 7, the method 100 of joining a first work piece and a second work piece, such as the inner panel 12 and outer panel 14 of FIG. 1, is discussed with respect to the embodiment of the system 10 of FIGS. 1-6. The method 100 begins in block 102, in which the panels 12, 14 are supported on fixture 16. The method 100 includes block 104, providing an outer surface 34 of the roller head 30 of the tool assembly 22 that has a coefficient of friction sufficient to grip a surface 32 of the inner panel 12 (or outer panel 14) which it contacts during different blocks of the method 100. For example, the surface 34 may be knurled, as shown in FIG. 3, or otherwise treated or formed with a roughened surface. The processing of the surface 34 may be carried out under the method 100, or may be carried out separately, with the end product simply provided on the roller head 30 used in the method 100. The panel 12 or 14 that the vibrating roller head 30 contacts will move with the roller head 30 in the direction of vibration due to the surface 34.

In block 106, the inner panel 12 and the outer panel 14 are joined to one another by a first solid state seam weld 52 at an interface 54 of the panels 12, 14 with a vibrating roller head 30 of the tool assembly 22, which is a robotically-controlled ultrasonic seam welder. Block 106 includes block 108, moving one of the roller head 30 and the fixture 16 so that the roller head 30 moves along a predefined path 44 on the panels 12, 14 while providing a normal force 50 to the panels 12, 14 through the roller head 30. The robotic assembly 20 may be moved while the fixture 16 with panels 12, 14 thereon remains stationary, the fixture 16 may be moved while the robotic assembly 20 remains stationary, or both the robotic assembly 20 and the fixture 16 may be moved to cause the roller head 30 to move along the predefined path 44. Block 106 also includes block 110, vibrating the roller head 30 during moving in block 108 to create the first solid state weld 52 of the panels 12, 14.

After the panels 12, 14 are joined by the first solid state weld 52, a flange 56 of the outer panel 14 is hemmed about an outer periphery 58 of the inner panel 12 in block 112 using the same roller head 30, or, optionally, a different roller head similar to roller head 30 but not necessarily knurled or otherwise having a surface 34 with a coefficient of friction as described above. During block 112, a force is applied near the outer periphery 58 of the inner panel 12 in block 114, to bend the flange 56 of the outer panel 14 around at least a portion of the outer periphery 58 to at least partially hem the inner panel 12 with the outer panel 14 while the panels 12, 14 remain supported on the fixture 16. In the final position 62 of FIG. 4, the flange 56 may be referred to as a hem. Block 112 may be referred to as roll hemming.

After the hemming with the flange 56 carried out in block 112, completion of the method of joining 100 occurs in block 116 in which the hemmed flange 56 is joined to the inner panel 12 by a second solid state seam weld 64 with the vibrating roller head 30 of the tool assembly 22. Block 116 includes block 118, in which one of the roller head 30 and the fixture 16 is moved so that the roller head 30 moves along a predefined path 66 on the panels 12, 14 while providing a normal force 50 to the panels 12, 14 through the roller head 30. Block 116 also includes block 120, vibrating the roller head 30 during moving in block 118 to create the second solid state weld 64 of the panels 12, 14. The entire method 100 is carried out with the panels 12, 14 in the same fixture 16. No sealer is required at the area 70 of FIG. 6 near the edge of the flange 56 and the inner panel 12. The second solid state weld 64 is sufficiently consistent across the entire length of the flange 56 such that water cannot enter the area 72. Thus, the panels 12, 14 joined according to the method 100 eliminate the need for adhesive and sealer and the associated processing steps, work cells, and fixtures.

While the best modes for carrying out the invention have been described in detail, those familiar with the art to which this invention relates will recognize various alternative designs and embodiments for practicing the invention within the scope of the appended claims.

The invention claimed is:

1. A method of joining a first work piece to a second work piece comprising:
   supporting the work pieces on a fixture;
   joining the work pieces to one another by a first solid state weld with a vibrating roller head of a robotically-controlled ultrasonic welder;
   hemming a flange of the second work piece about an outer periphery of the first work piece using the roller head with the work pieces supported by the fixture; and
   joining the hemmed flange to the first work piece by a second solid state weld with the roller head of the robotically-controlled ultrasonic welder.

2. The method of claim 1, wherein the joining the work pieces to one another by a first solid state weld includes:
   moving one of the roller head and the fixture so that the roller head moves along a predefined path on the work pieces while providing a normal force to the work pieces through the roller head; and
   vibrating the roller head during said moving to create the first solid state weld of the work pieces.

3. The method of claim 1, wherein the joining the hemmed flange to the first work piece by the second solid state weld includes:
   moving one of the roller head and the fixture so that the roller head moves along at least a portion of the flange while providing a normal force to the at least a portion of the flange through the roller head; and
   vibrating the roller head during said moving the roller head along said at least a portion of the flange to create the second solid state weld of the work pieces at the hemmed flange.

4. The method of claim 1, wherein said joining the work pieces to one another and said joining the hemmed flange to the first work piece includes moving the roller head relative to the first work piece along a predefined path in a direction of rolling, and further comprising:
   providing a surface of the roller head characterized by a sufficient coefficient of friction such that the roller head grips the first work piece and causes the first work piece to move laterally with the roller head transverse to the direction of rolling.

5. The method of claim 1, wherein the work pieces are characterized by an absence of adhesive at the hemmed flange.

6. The method of claim 1, wherein the work pieces are characterized by an absence of sealer at the hemmed flange.

7. The method of claim 1, wherein the work pieces are one of steel, an aluminum alloy, a magnesium alloy, a titanium alloy, or any combination thereof 8. The method of claim 1, further comprising:
clamping the first and second work pieces to the fixture.

9. A method of joining a first work piece and a second work piece comprising:
supporting the work pieces on a fixture with the first work piece positioned at least partially on top of the second work piece;
moving one of a roller head of a tool assembly and the fixture via a robotic mechanism so that the roller head moves relative to the first work piece in a direction of rolling along a predefined path on the work pieces while providing a normal force to the work pieces via the robotic mechanism through the roller head;
vibrating the roller head during said moving one of the roller head and the fixture to create a first solid state weld of the work pieces at a first interface of the work pieces;
applying force near an outer periphery of the second work piece to bend a portion of the second work piece around at least a portion of a periphery of the first work piece to at least partially hem the first work piece with the second work piece while the work pieces remain supported on the fixture; wherein the applying force is through the roller head;
providing a surface of the roller head characterized by a sufficient coefficient of friction such that the roller head grips the first work piece and causes the first work piece to move laterally with the roller head transverse to the direction of rolling;
moving one of the roller head and the fixture via the robotic mechanism so that the roller head moves along at least a portion of the second work piece while providing a normal force to said at least a portion of the hem via the robotic mechanism through the roller head so that the second work piece hems the first work piece; and
vibrating the roller head during said moving one of the roller head and the fixture along said at least a portion of the second work piece to create a second solid state weld of the work pieces at the hem.

10. The method of claim 9, wherein the work pieces are characterized by an absence of adhesive at an interface of the work pieces.

11. The method of claim 9, wherein the work pieces are characterized by an absence of sealer at the at least a portion of the second work piece.

12. The method of claim 9, further comprising:
clamping the first and second work pieces to the fixture.

* * * * *